United States Patent
Muzzarelli

Patent Number: 6,154,977
Date of Patent: Dec. 5, 2000

[54] APPARATUS FOR DRYING CYLINDRICAL AND/OR PARALLELEPIPED BALES OF MOIST FORAGE

[75] Inventor: Gabriele Muzzarelli, Casinalbo, Italy

[73] Assignee: Framer Engineering Gesellschaft m.b.H., Austria

[21] Appl. No.: 09/171,164

[22] PCT Filed: Apr. 21, 1997

[86] PCT No.: PCT/EP97/02006

§ 371 Date: Oct. 14, 1998

§ 102(e) Date: Oct. 14, 1998

[87] PCT Pub. No.: WO97/40330

PCT Pub. Date: Oct. 30, 1997

[30] Foreign Application Priority Data

Apr. 23, 1996 [IT] Italy ................................ MO96A0050

[51] Int. Cl.[7] ........................................................ F26B 19/00
[52] U.S. Cl. ................................................................ 34/225
[58] Field of Search ............................ 34/218, 219, 224, 34/225; 56/341

[56] References Cited

FOREIGN PATENT DOCUMENTS

| | | | |
|---|---|---|---|
| 0 361 099 | 4/1990 | European Pat. Off. | ........ A01F 25/08 |
| 0 534 382 A1 | 3/1993 | European Pat. Off. | ........ F26B 21/00 |
| 27 09 482 | 9/1977 | Germany | ........... F24F 5/00 |

*Primary Examiner*—William Doerrler
*Assistant Examiner*—Maliik N. Drake
*Attorney, Agent, or Firm*—Steinberg & Raskin, P.C.

[57] ABSTRACT

An apparatus for drying cylindrical and/or parallelepiped bales of moist forage including an assembly of horizontally extending balanced isobaric ventilation chambers in overlying relationship. A lower ventilation chamber has blowing apertures on an upper face and is able to withstand the weight of the bales positioned directly on it in correspondence with the relative blowing apertures. The upper ventilation chamber has corresponding blowing apertures on a lower face whereas the intermediate ventilation chamber has corresponding blowing apertures on an upper face and a lower face and is able to withstand the weight of the bales positioned directly on it in correspondence with the relative upper blowing apertures. The ventilation chambers are movable vertically in two directions.

20 Claims, 3 Drawing Sheets

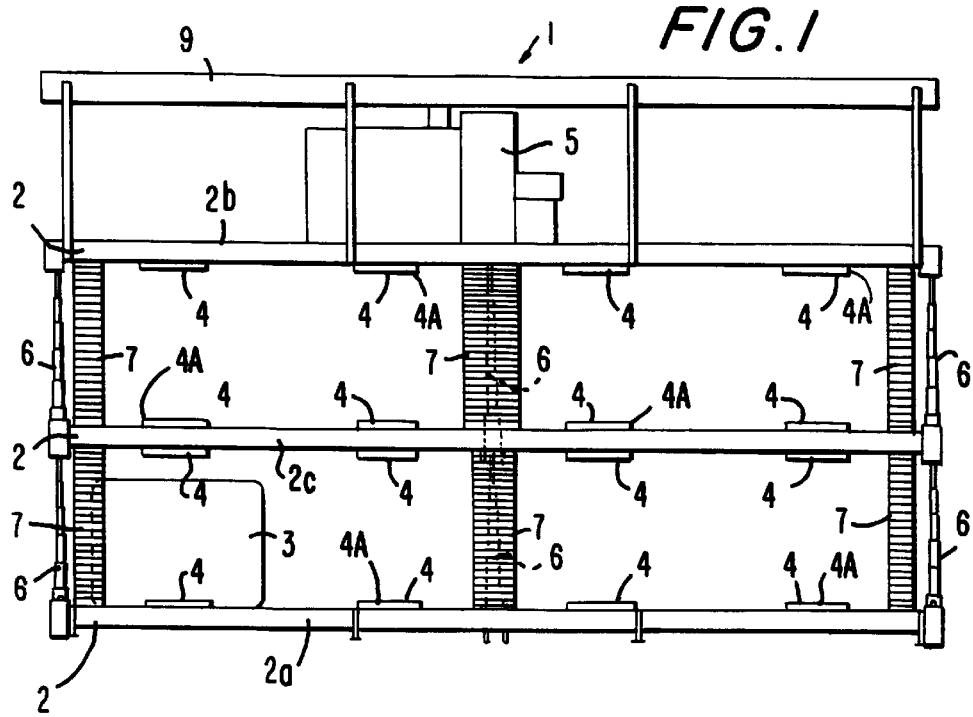
FIG. 1
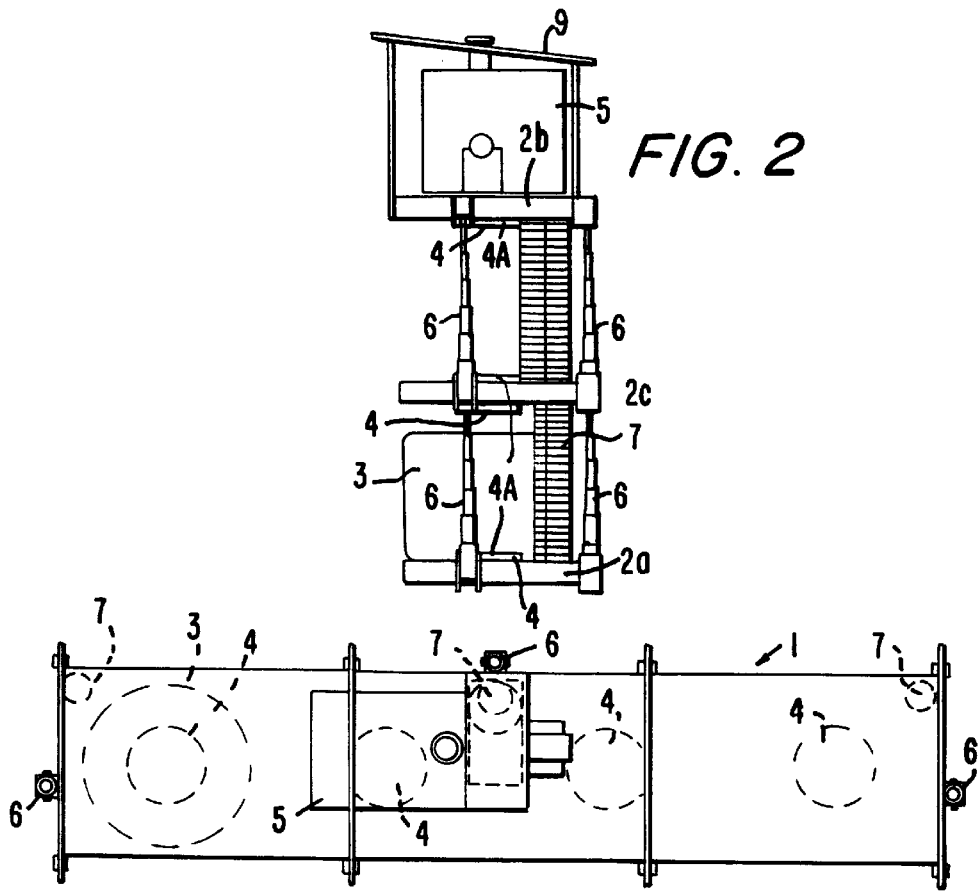
FIG. 2
FIG. 3

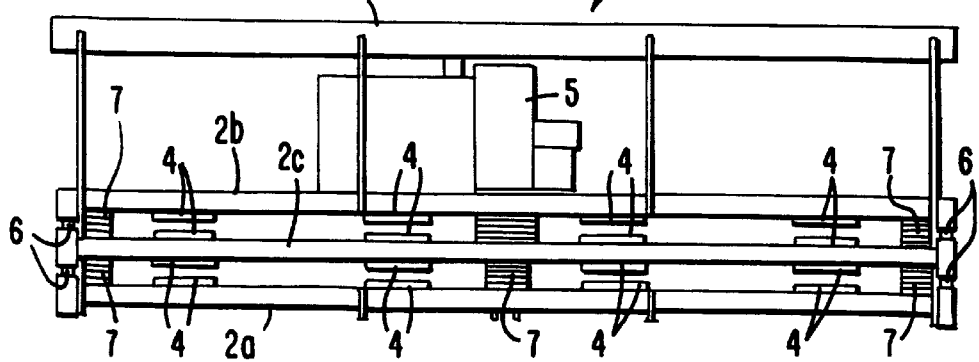
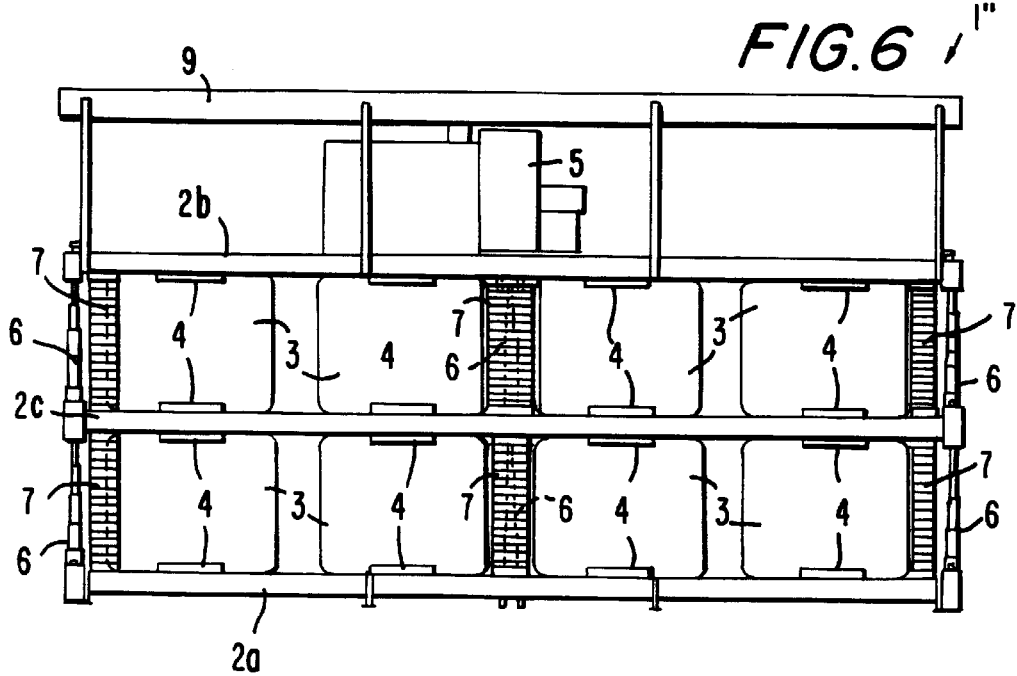

6,154,977

APPARATUS FOR DRYING CYLINDRICAL AND/OR PARALLELEPIPED BALES OF MOIST FORAGE

FIELD OF THE INVENTION

This invention relates to an apparatus for drying cylindrical and/or parallelepiped bales of moist forage.

BACKGROUND OF THE INVENTION

It is well known that before being stored, a large part of currently produced forage is compacted and packaged in the form of substantially cylindrical or prismatic bales. To prevent fermentation which would alter the forage during its storage, before being stored the bales may be subjected to artificial drying by appropriate apparatus.

Known artificial drying plants comprise substantially a ventilation chamber provided with air blowing apertures, at each of these apertures there being positioned one or two opposing flat faces of a bale to be dried. A dry air stream is conveyed through the blowing apertures to pass through the forage mass, so drying it. This dry air stream is produced by a centrifugal blower connected to the ventilation chamber.

The main drawback of these drying plants is irregular dry air distribution within the bale mass. This produces non-uniform drying of the forage due to air loss caused by preferential passages in the air flow which arise within the bale because of its lack of uniformity, with consequent considerable energy wastage and a lengthening of the drying time.

This phenomenon is even more apparent in soft-core bales, as the presence of more compacted peripheral forage regions means that the flow of drying air is greater along the bale axis and through its lower side surface. A critical region is therefore created, located in the bale upper region, which requires more time for drying.

Various solutions have been proposed for obviating this problem, such as using a dry air outlet aperture of ring shape instead of circular, or hindering air exit from the top of the bale by a sort of cover. The proposed solutions have not however given satisfactory results. In this respect, the bale drying is still non-uniform with consequent risk of fermentation in the case of bales of relatively high average moisture content (for example exceeding 40%). In addition, to reduce the risk of obtaining a fermentation region to a minimum, the drying action of the entire bale is often protracted, with considerable energy wastage. A further drawback is the fact that significant quantities of dry air can escape between the blowing aperture and the bale surface, with further energy wastage.

Another known system is to stack two bales of moist forage by sandwiching them between two air blowing chambers and blow air through circular blowing apertures. This solution has also not given good results, being of limited efficiency because of the excessive weight acting on the lower end of the underlying bale.

A further known system (see EP-A-0534382) is to use manifolds or headers between one bale and another provided with blowing apertures bordered by projecting peripheral rings which are inserted into the bale and achieve a certain seal. However these headers are not self-supporting and are fed by dead channels. This has substantially improved the effectiveness of the apparatus in that each blowing aperture is assigned to drying, and in fact dries, only its relative half of a bale. However the efficiency is still too penalized with regard to the lower bales, because these latter are squashed by the weight of the bales stacked on them, and because of preferential dry air paths which arise in the bale because of the kinetic energy which the air originating from the channels possesses.

OBJECTS AND SUMMARY OF THE INVENTION

An object of the present invention is to solve the aforesaid problems by providing an apparatus for drying bales of forage of any initial moisture content, which ensures substantially uniform and efficient bale drying.

A further object of the invention is to provide an apparatus in which parallelepiped bales can be dried in addition to cylindrical bales.

The initially stated object is attained by the apparatus for drying bales of moist forage according to the present invention, characterised by comprising an assemblage of horizontally extending balanced isobaric ventilation chambers in overlying relationship, the lower ventilation chamber presenting a plurality of blowing apertures on its upper face and being able to withstand the weight of the bales positioned directly on it in correspondence with the relative blowing apertures, the upper ventilation chamber presenting a corresponding plurality of blowing apertures on its lower face, the intermediate ventilation chambers presenting a corresponding plurality of blowing apertures both on their upper face and on their lower face and being able to withstand the weight of the bales positioned directly on them in correspondence with the relative upper blowing apertures, means being provided for mutually moving the ventilation chambers vertically in the two directions.

It should be noted that the term "balanced isobaric" as used above with reference to the ventilation chambers signifies chambers in which the area of the passage cross-section for the dry air stream, generated by a blower-heater, is considerably greater than that of an individual blowing aperture, said chambers being connected together in ring formation so that within the various ventilation chambers and at every point thereof there is substantially the same pressure when the apparatus is fully working, and moreover even though there may be different flow rates leaving the individual blowing apertures (due to possible different compaction of the various bales), the same pressure is maintained in correspondence with each blowing aperture. The ventilation chambers conveniently have a metal structure, in particular of steel plate.

To achieve the second stated object, the apparatus of the invention is provided with removable adaptors which enable the shape of the blowing apertures to be varied so as to be also able to dry parallelepiped bales if the blowing apertures provided are for cylindrical bales, and vice versa.

BRIEF DESCRIPTION OF THE DRAWINGS

The invention will be more apparent from the following description of some embodiments thereof. In this description reference is made to the accompanying drawings, in which:

FIG. 1 is a schematic front elevation of the apparatus according to the invention, shown in its open condition;

FIG. 2 is a side elevation thereof;

FIG. 3 is a plan view thereof from above;

FIG. 4 is also a front elevation thereof, but shown in its closed condition;

FIG. 5 is a side elevation thereof;

FIG. 6 is a front elevation thereof shown in its open condition and with the bales inserted;

DETAILED DESCRIPTION OF THE PREFERRED EMBODIMENTS

Figure 7:
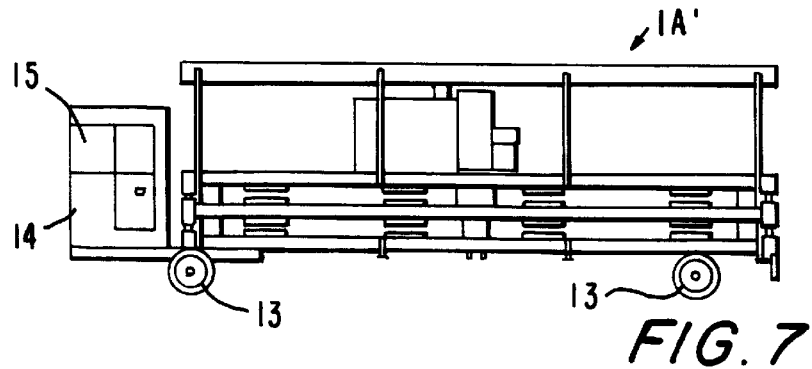
FIG. 7 is a front elevation of a modified embodiment of the invention shown in its closed condition, the apparatus being of the self-propelled type.

From FIGS. 1 to 6 it can be seen that the bale drying apparatus, indicated overall by the reference numeral 1, comprises an assemblage 2 of three ventilation chambers 2a, 2b and 2c which also act as support means for the bales 3 of forage to be dried.

As can be seen from the figures, the three ventilation chambers are different, in the sense that the lower ventilation chamber 2a also acts as the base for resting on the ground and/or as a load-bearing frame if the apparatus is trolley-mounted or self-propelled, and comprises a set of four blowing headers each consisting of a circular aperture 4 from which the blown dry air leaves, and a relative upwardly projecting border ring 4A which on being inserted into the forage in practice enables a seal to be obtained when a cylindrical bale (in FIGS. 1 and 3, one is shown indicated by 3) is rested by one of its two flat faces in the ventilation chamber 2a in correspondence with one of the blowing headers (4, 4A).

The upper ventilation chamber 2b, in addition to comprising on its lower face a set of four aligned blowing headers 4 identical to those of the lower chamber 3a, also has the task of supporting the blower-heater unit 5, and a roof 9 which protects the blower-heater unit 5 and also covers the ventilation chamber assemblage 2.

The intermediate ventilation chamber 2c is positioned between the chambers 2a and 2b and is provided with four aligned blowing headers 4 both on its upper face and on its lower face, these headers 4 being identical to those of the other two chambers 2a and 2b and being arranged in corresponding positions.

The intermediate chamber 2c is able to withstand the weight of the bales 3 (FIG. 6) which are rested on it in correspondence with the relative upper blowing headers 4.

The upper and intermediate ventilation chambers 2b and 2c respectively are supported by relative hydraulic telescopic cylinder-piston units 6, forming part of the apparatus 1, which enable them to be raised and lowered so as to move the drying apparatus 1 from its so-called open condition (FIGS. 1, 2 and 6) to its closed condition (FIGS. 4 and 5) and vice versa, and to allow correct positioning of the bales 3 to be dried.

As can be seen from the figures, the ventilation chambers 2a, 2b and 2c are connected together by bellows ducts 7 of suitable diameter which enable a dry air stream generated by the blower-heater unit 5 to be fed to each chamber 2a, 2b and 2c, and in addition form a ring connection between the chambers which means that the dynamic pressure of the air stream leaving the blower-heater unit 5 is converted substantially into a uniform static pressure in all the ventilation chambers 2a, 2b and 2c, so that the pressure is the same in correspondence with each blowing header 4, notwithstanding the fact that the air flow rate leaving each header 4 can be different (because of the possible different compacting of the forage in the various bales 3 to be dried).

In this manner, balanced isobaric chambers are obtained giving an optimum result with low energy consumption.

As can be seen from FIGS. 1–3 the bellows ducts 7 are all located in the rear part of the apparatus 1 so that when the apparatus is open (FIGS. 1 and 2) the loading of the bales 3 to be dried is not hindered. The telescopic hydraulic cylinder-piston units 6 are three in number in this specific case (but could be of a different number, for example only one if suitable movement guides are provided), located in such a position (FIG. 6) as not to hinder bale loading.

FIGS. 4 and 5 show the same drying apparatus in the closed condition (indicated by 1'), it being of considerable compactness and minimum bulk.

FIG. 6 shows the same apparatus 1 in the operating condition, the apparatus 1" being shown already loaded with the bales 3 to be dried. To reach this condition (FIG. 6) starting from the closed condition (FIGS. 4 and 5), the hydraulic cylinder-piston units 6 are operated to bring the ventilation chambers 2b and 2c to a level higher than that of FIG. 6, so as to be able to comfortably position the relative bales 3 to be dried on the lower chamber 2a and intermediate chamber 2c, in correspondence with the respective blowing headers 4, and then lower the chambers 2b and 2c so that the projecting annular rim 4A of the relative lower headers 4 becomes inserted into the forage, to obtain a seal.

Figure 9:
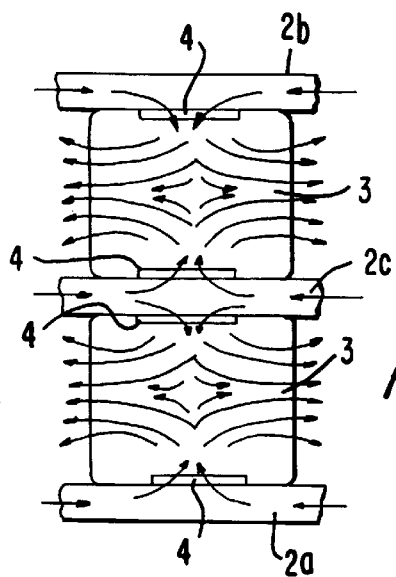
FIG. 9 is a partial front elevation of the apparatus according to the invention, showing schematically the passage of the lines of flow of the dry air during the operation of the apparatus.

At this point the blower-heater unit 5 can be operated so that, when normal working conditions have been attained, an air stream substantially at the same pressure flows from each blowing header 4, its lines of flow being as shown in FIG. 9.

By operating the blower-heater unit 5 for a suitable time the forage forming an individual bale 3 can be dried to the required degree in a substantially uniform an hence optimum manner, with an energy consumption decidedly lower than known drying apparatus.

FIG. 7 shows in the closed condition a modified embodiment 1A' of the apparatus of FIGS. 1–6 in a self-propelled version, the drying apparatus basically forming part of a truck.

Figure 8:
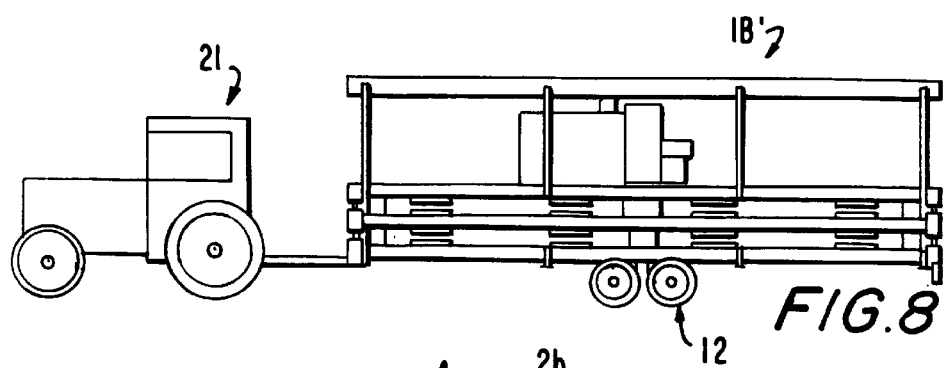
FIG. 8 is a front elevation of a further embodiment of the invention shown in its closed condition, the apparatus being provided with a trolley to enable it to be towed by a tractor.

In the version 1B' of FIG. 8, the drying apparatus when in its closed condition forms part of a trailer which can be towed by a tractor 21.

The aforedescribed apparatus are particularly suitable for dying cylindrical bales.

If parallelepiped bales are to be dried, it is convenient to provide appropriate headers.

Figure 10:
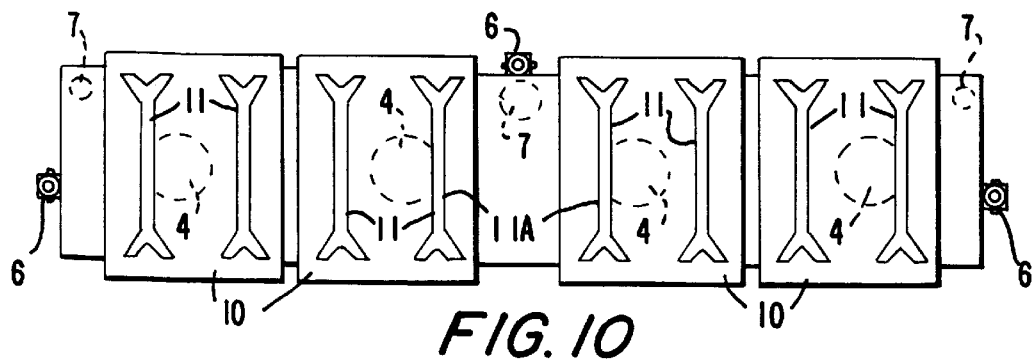
FIG. 10 is a schematic plan view of one of the ventilation chambers, provided with adaptors for drying parallelepiped bales.

In particular, FIG. 10 shows adaptors 10 applicable to the ventilation chambers to modify the shape of the (circular) port of the blowing headers. The adaptors 10 are applied to the individual upper headers 4 of the intermediate chamber 2c to convert the port of the blowing headers 4 from circular into two header ports 11 of double-Y shape, each provided with an upwardly projecting rim 11A to form a seal. In correspondence with each double-Y header there can be placed one parallelepiped bale (not shown), positioned in such a manner that its straps (which pass along four of its consecutive lateral faces forming opposing pairs) do not lie in correspondence with the headers 11.

By virtue of the adaptors 10 of FIG. 10, the relative drying apparatus 1C can be used either for cylindrical bales or for parallelepiped bales.

Obviously, if mainly parallelepiped bales are to be dried, the ventilation chambers 2a, 2b and 2c will be directly provided with double-Y blowing headers 11, with the facility for providing adaptors to convert a pair of double-Y headers 11 into a circular header 4.

From FIGS. 1 to 6 it can be seen that the relative apparatus 1 can be preassembled in the workshop ready for operation, without assembly work being required on the user's premises. The apparatus can also be made wheel-mounted or self-propelled (FIGS. 7 and 8) so as to follow the mowing and bale preparation. In all cases, the apparatus has a structure which is simple to construct and assemble, so that the relative production costs are particularly low.

Moreover in practice the apparatus of the invention avoids squeezing of the drying forage, which could prevent an optimum result being obtained.

Again, the fact that the drying air is fed simultaneously from two opposing faces of the bale prevents in practice the formation of preferential paths within the bale for the drying air (the air being compelled to leave from the lateral surface of the bale), with consequent significant energy saving, and optimization of results.

As has been seen, by virtue of the present invention it is also possible, by providing blowing headers with a suitably shaped port, to dry cylindrical or parallelepiped bales, or even bales of both types if suitable removable adaptors are provided.

The apparatus of the present invention can be provided with an electrical generator and fuel tank to render it independent. In this case, by also providing suitable electric motors operable by the electricity generated by the generator, and fitting the drying apparatus with suitable wheels or tracks operated by said motors, the apparatus can be made self-propelled.

Finally by providing the apparatus with removable or foldable closure panels or extendable tarpaulins, of the type used on trucks, the forage being dried can be prevented from being wetted by rain during operation.

What is claimed is:

1. An apparatus (1; 1A'; 1B'; C) for drying cylindrical (3) or parallelepiped bales of moist forage, comprising an assemblage (2) of horizontally extending ventilation chambers (2a, 2b, 2c) in overlying relationship, the lower ventilation chamber (2a) presenting a plurality of blowing apertures (4; 11) on its upper face, the bales (3) being positioned on the lower ventilation chamber (2a) in correspondence with the relative blowing apertures (4; 11), the upper ventilation chamber (2b) presenting a corresponding plurality of blowing apertures (4; 11) on its lower face, the intermediate ventilation chambers (2c) presenting a corresponding plurality of blowing apertures (4; 11) both on their upper face and on their lower face, the bales (3) being positioned on the intermediate ventilation chamber (2c) in correspondence with its upper blowing apertures (4; 11), means (6) being provided for mutually moving the ventilation chambers (2a, 2b, 2c) vertically in the two directions, characterized in that the ventilation chambers (2a, 2b, 2c) are balanced isobarically and are able to withstand the weight of the bales (3) directly positioned on it.

2. A drying apparatus (1; 1A'; 1B') as claimed in claim 1, wherein the blowing apertures (4) are bordered by an outwardly projecting rim (4A; 11A).

3. A drying apparatus (1; 1A'; 1B') as claimed in claim 2 for drying cylindrical bales (3), wherein the blowing apertures are circular (4).

4. A drying apparatus (1; 1A'; 1B') as claimed in claim 2 for parallelepiped bales, wherein the blowing apertures (11) are of double-Y shape.

5. A drying apparatus (1C) as claimed in claim 2, wherein adaptors (10) are provided for transforming the shape of the blowing apertures (4) so as to be able to also dry parallelepiped bales if blowing apertures suitable for cylindrical bales (3) have been provided, and vice versa.

6. A drying apparatus (1; 1A'; 1B'; 1C) as claimed in claim 1, wherein a single intermediate ventilation chamber (2c) is provided.

7. A drying apparatus (1; 1A'; 1B'; 1C) as claimed in claim 1, wherein the vertical movement of the upper ventilation chamber (2b) and intermediate ventilation chamber (2c) in the two directions is obtained by telescopic cylinder-piston units (6).

8. A drying apparatus (1; 1A'; 1B'; 1C) as claimed in claim 6, wherein four aligned blowing apertures (4) are provided on those faces of the ventilation chambers (2a, 2b, 2c) which face the bales.

9. A drying apparatus (1; 1A'; 1B'; 1C) as claimed in claim 1 wherein the upper ventilation chamber (2b) also carries a blower-heater unit (5).

10. A drying apparatus as claimed in claim 1, wherein the ventilation chambers (2a, 2b, 2c) are connected together by bellows ducts (7).

11. A drying apparatus (1B') as claimed in claim 6, provided with a trolley (12) enabling it to be transported by towing.

12. A drying apparatus (1A') as claimed in claim 6, provided with wheels (13), an engine (14) and a driving position (15) to render it self-propelled.

13. A drying apparatus as claimed in claim 6, provided with an electrical generator unit and relative fuel tank.

14. A drying apparatus as claimed in claim 13, provided with one or more electric motors powered by the electrical generator unit and suitable wheels or tracks operated by said motors, to render the apparatus self-propelled.

15. A drying apparatus (1; 1A'; 1B'; 1C) as claimed in claim 1, provided with means for preventing the forage from being wetted by rain during operation.

16. An apparatus for drying cylindrical parallelepiped bales of moist forage, comprising
an assembly of horizontally extending ventilation chambers in overlying relationship, a lowermost one of the ventilation chambers having a plurality of blowing apertures on an upper face, the bales being positionable on the lower ventilation chamber in correspondence with the relative blowing apertures, an uppermost one of the ventilation chambers having a corresponding plurality of blowing apertures on a lower face, an intermediate one of the ventilation chambers having a corresponding plurality of blowing apertures on an upper face and a lower face, the bales being positionable on the intermediate ventilation chamber in correspondence with the blowing apertures on the upper face, and
means for mutually moving the ventilation chambers vertically in two directions,
the ventilation chambers being balanced isobarically and structured and arranged to withstand the weight of the bales directly positioned thereon.

17. The drying apparatus of claim 16, wherein the blowing apertures are bordered by an outwardly projecting rim.

18. The drying apparatus of claim 17, wherein the blowing apertures are circular.

19. The drying apparatus of claim 17, wherein the blowing apertures are double-Y shape.

20. The drying apparatus of claim 17, further comprising adaptors for transforming the shape of the blowing apertures so as to be able to dry parallelepiped bales if blowing apertures suitable for cylindrical bales have been provided, and vice versa.

* * * * *

UNITED STATES PATENT AND TRADEMARK OFFICE
CERTIFICATE OF CORRECTION

PATENT NO. : 6,154,977
DATED : December 5, 2000
INVENTOR(S) : MUZZARELLI, Gabriele It is certified that error appears in the above-identified patent and that said Letters Patent is hereby corrected as shown below:

Title Page, Item [73], Assignee;
First name should be set forth as <u>Farmer</u>.

Signed and Sealed this

First Day of May, 2001

*Attest:*

NICHOLAS P. GODICI

*Attesting Officer*  *Acting Director of the United States Patent and Trademark Office*